No. 774,072. PATENTED NOV. 1, 1904.
G. HALL.
SHEARING AND SHAPING MACHINE.
APPLICATION FILED JAN. 11, 1904.
NO MODEL. 2 SHEETS—SHEET 1.

Witnesses: Inventor
Geo. Hall,
By
Attorneys.

No. 774,072. PATENTED NOV. 1, 1904.
G. HALL.
SHEARING AND SHAPING MACHINE.
APPLICATION FILED JAN. 11, 1904.
NO MODEL. 2 SHEETS—SHEET 2.

Witnesses:
K. H. Butler
E. E. Potter

Inventor
Geo. Hall,
By N. C. Ever & Co.
Attorneys.

No. 774,072. Patented November 1, 1904.

UNITED STATES PATENT OFFICE.

GEORGE HALL, OF McKEESPORT, PENNSYLVANIA.

SHEARING AND SHAPING MACHINE.

SPECIFICATION forming part of Letters Patent No. 774,072, dated November 1, 1904.

Application filed January 11, 1904. Serial No. 188,504. (No model.)

*To all whom it may concern:*

Be it known that I, GEORGE HALL, a citizen of the United States of America, residing at McKeesport, in the county of Allegheny and State of Pennsylvania, have invented certain new and useful Improvements in Shearing and Shaping Machines, of which the following is a specification, reference being had therein to the accompanying drawings.

This invention relates to certain new and useful improvements in hydraulic shearing and shaping presses, and more particularly to that class of presses wherein cups are formed or pressed from which tubing is made.

The object of my invention is to provide a hydraulic shearing and shaping press whereby a sheet of metal may be sheared to the size desired and a cup pressed from this sheared sheet, means being provided whereby these operations are performed at predetermined times, but almost simultaneously.

Another object of my invention is to construct a press in conjunction with a shearing mechanism whereby an extra shearing device is dispensed with, the machine being so constructed as to properly shear the piece of material the desired size and then cup the same, so it may be then taken to the tubing-machine, where the tubes are formed by expanding or stretching the cups.

The invention consists in the novel construction, combination, and arrangement of parts, to be hereinafter more fully described, and specifically pointed out in the claims.

In describing the invention in detail reference is had to the accompanying drawings, forming a part of this application, and wherein like numerals of reference indicate like parts throughout the several views, in which—

Figures 1, 2:
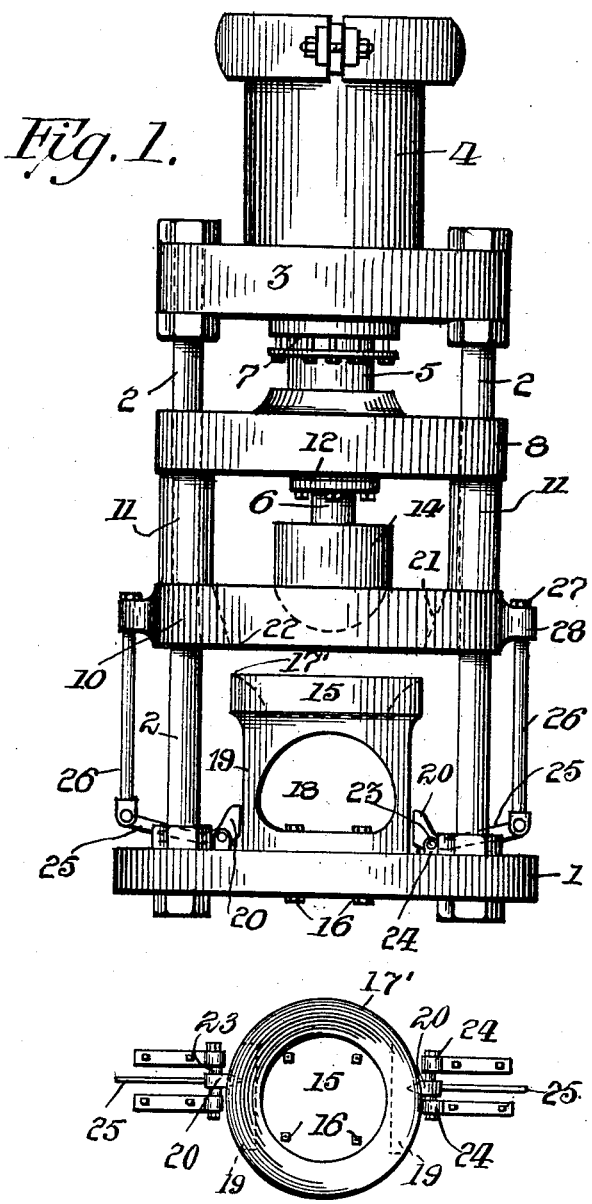
Figure 3:
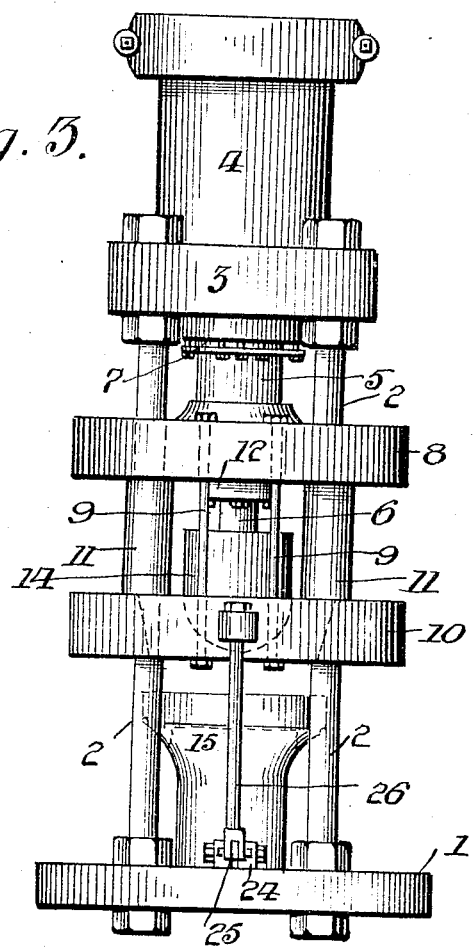
Figure 4:
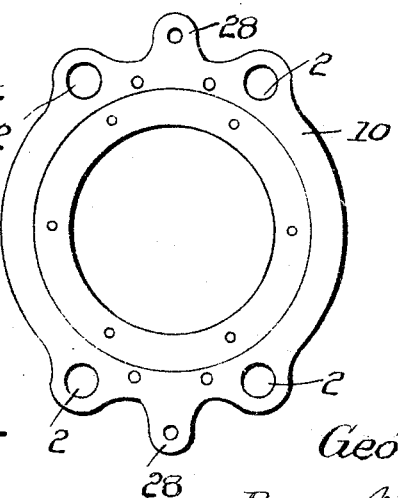

Figure 1 is a front view of my improved hydraulic shearing and shaping press. Fig. 2 is a detail plan view of the cup-die and the shears. Fig. 3 is a side elevation of my improved hydraulic shearing and shaping press. Fig. 4 is a detail plan view of one of the sliding cross-heads.

My invention embodies a female die which is provided with a cutting edge and also has a cup-forming recess, together with a vertically-movable male die adapted to coact or coöperate with the female die to cup the plate, and a slidably-mounted cross-head which acts as a cutter or shearer and coacts or coöperates with the cutting edge of the female die for the purpose of shearing a plate into size for cupping. In connection with the mechanism for shearing the plate into size for cupping and the mechanism for cupping the plate I provide means for shearing the waste material cut from the plate in the sizing thereof, whereby this waste material, which after the plate has been cut to size is lying around the female die, may be sheared or cut in order to permit its ready removal.

A construction involving the above features will now be described, and with reference to the drawings, 1 indicates the base of a frame, and 3 the top cross-head thereof, and mounted in the base 1 and in the top cross-head are standards 2, which may be held rigid by nuts thereon on opposite sides of the base and to cross-heads, respectively, as shown. A hydraulic cylinder 4 of any approved or ordinary form of construction may be conveniently supported on the top cross-head 3, the plunger 5 for said cylinder operating through the top cross-head and through a stuffing-box 7 of any approved form of construction. This plunger 5 at its lower end is secured to a sliding cross-head 8, which moves vertically on the standards 2. This sliding cross-head 8 has connected thereto in any suitable manner, as by means of an annular flange 12, bolted or otherwise secured to the cross-head, an auxiliary plunger 6, which is in axial line with the plunger 5 and carries the male member 14 of the dies, which cup the sized plate into form for drawing into tube or pipe.

Mounted on the base 1 and secured thereto in any desirable manner—as, for instance, by means of bolts 16—is the female member 15 of the dies, which cup the plate into form for being drawn into a tube or pipe. This female die 15 is provided in its top with a cup-forming recess extending through from the top of the die and communicating with a lateral opening 18, extending through the die. The wall 17 of the cup-forming recess is beveled, as indicated by dotted lines in Fig. 1, and this beveled wall terminates at its upper end at the edge of the head of the die, thus forming a sharp cutting edge 17' on the female die, which is adapted to coact or coöperate with a cutting edge carried by the coacting shearing or plate-sizing member. This coacting shearing or plate-sizing member is in the form of a cross-head 10, which is slidable on the standards 2 in unison with the sliding cross-head 8, this uniform movement being effected by means of bolts 9, connecting the two cross-heads 8 and 10, sleeves 11, surrounding the standards 2 between the cross-heads, maintaining the constant relative position between the two cross-heads. The cross-head 10, which forms the shearing member to coact with the female die in the sizing of the plate, is provided with an opening 21 of frusto-conical form, the larger end of the opening being at the upper face of the plate and the smaller end of the opening being of a size which will permit of the cross-head 10 descending over the upper end of the female die 15. The edge 22, formed at the lower end of the opening 21, coacts with the cutting edge 17' on the female die to shear the plate that is adapted to be placed between the member 10 and the female die 15 into size for cupping.

The cross-head or member 10 is provided on opposite sides with apertured lugs 28, through which is passed rods or links 26, held in said lugs by means of nuts 27 on their upper ends. The lower ends of these rods or links 26 are pivotally connected to extending arms 25, carried by the knives or cutters 20, which are carried on shafts 23, mounted in bearings or journals 24, secured to the base 1. In order to allow the inward throw or movement of the knives 20, I provide opposite sides of the female die 15 with cut-away portions 19, which, however, do not extend entirely to the top of the female die, and consequently the cutting edge 17' of said female die is not destroyed.

The operation of the device is as follows: A plate to be sheared into size for cupping is placed on top of the female die 15. These plates in practice come to the operator of approximate size; but before being pressed into the cup from which a pipe or tube is formed it is the general practice to place the plate in a shearing-press in order to exactly size the same for the particular size of the cup desired. In my device this sizing is accomplished in the same machine as is used for the cupping. When the plate has been placed on top of the female die, as above stated, the operating fluid is admitted into the hydraulic cylinder 4, causing a downward movement of plungers 5 and 6, male die 14, and cross-heads 8 and 10. The cross-head 10, descending slightly in advance of the male die 14, first engages the plate that is placed on top of the female die, and the cutting edges 22 17' shear the plate to the exact size for cupping. The cross-head 10, which acts as one of the shearing members, is so disposed with relation to the female die 15 that immediately upon the completion of the shearing operation to size the plate or just as this operation is being completed the lower end of the male die 14 comes into engagement with the upper face of the plate, and during the further descent of the movable parts stated this male die forces the plate into the cup forming recess in the female die and forms the same into a cup which is forced through into the laterally-extending opening 18, from which it may be readily removed. The downward movement of the parts referred to moves the rods or links 26 downwardly, thus bearing down on the outer ends of the arms or extensions 25 and throwing the cutting-blades 20 outwardly in order that the waste material which has been cut from the plate by the member 10 and female die 15 in the sizing operation may drop between the female die 15 and the cutting-blades 20. As the vertically-movable parts ascend the rods or links 26, pulling upward on the outer ends of arms or extensions 25 of the cutting-knives, cause the blades 20 of said knives to be forced inwardly against the waste material, thus separating the same into two portions or sections, whereby it may be readily removed from the female die.

In this application I have shown and described cutting-knives disposed at opposite sides of the female die; but I do not wish to be understood as confining myself to the use of these cutting-knives as disposed in this particular relation, as but one knife or a greater number of knives could be employed, and it will be evident that this and like changes may be made in the details of construction without departing from the general spirit of the invention.

Having fully described my invention, what I claim as new, and desire to secure by Letters Patent, is—

1. In a hydraulic shearing and shaping press, the combination of a frame comprising a base, a stationary upper cross-head, and standards secured in said base and stationary cross-head, a plurality of cross-heads slidably mounted on said standards and movable in unison, a hydraulic cylinder mounted on the stationary cross-head, a male die connected to the piston of said cylinder, a female die secured on the base of the frame and upon which the plate to be sheared is adapted to be placed, means whereby as the movable cross-heads and the male die descend the plate is first sheared to size and then cupped, and means operated by the cross-heads in their ascent to cut the sheared portion of the plate, substantially as described.

2. In a hydraulic shearing and shaping press, the combination of a frame comprising a base, a stationary upper cross-head, and standards secured in said base and stationary cross-head, a plurality of cross-heads slidably mounted on said standards and movable in unison, one of which has a central opening, and provided with a cutting edge, a hydraulic cylinder mounted on the stationary cross-head, a male die connected to the piston of said cylinder and movable through the cross-head having the opening, a female die secured on the base of the frame and upon which the plate to be sheared is adapted to be placed, said female die having a cutting edge coacting with the cutting edge of the aforesaid cross-head, and having a recessed upper face leading into an opening extending transversely through the said female die, as and for the purpose described.

3. In a shearing and shaping press, a frame having vertical standards, a female die mounted on the base of the frame, recessed in its upper end and having a cutting edge, and provided with a transverse opening communicating with the recess, a pair of cross-heads mounted one above the other to slide on the standards, the lowermost cross-head having an opening therethrough, and having a cutting edge coacting with that of the female die, a male die carried by the upper of said cross-heads, and means for operating said cross-heads to first shear a plate between the lowermost cross-head and female die, and then cup the plate by the male and female die, and force the cupped plate into the transverse opening in the female die, substantially as described.

4. In a hydraulic shear and shaping press, a frame having vertical standards, a female die mounted on the base of the frame, a hydraulic cylinder mounted on the frame, a pair of cross-heads mounted to slide on said standards, a plunger operating in the cylinder and connected to the upper sliding cross-head, a male die connected to said upper sliding cross-head, means on the lower sliding cross-head and coacting means on the female die for shearing a plate placed on the female die as the cross-heads descend, means in the female die coacting with the male die for cupping the plate after it is sheared, and means for cutting the sheared portions of the plate.

5. In a machine of the type described, the combination with a female die having a transverse opening therethrough, and having a recessed upper end communicating with the opening, and a cutting edge on the upper end of the die, of a cross-head having an opening therethrough, and having a cutting edge coacting with the cutting edge of the female die, a vertically-movable male die operating through the said cross-head, and means for operating said cross-head and male die to first shear a plate between the cross-head and female die and then cup the plate by the male die descending into the female die, substantially as described.

6. In a machine of the type described, the combination with a female die having a cutting edge and a cup-forming recess, of a cross-head having a cutting edge coacting with the cutting edge of the female die to shear and size a plate, a male die coacting with the cup-forming recess of the female die to cup the plate after it is sheared, and means for cutting the sheared-off portions of the plate, substantially as described.

7. In a shearing and shaping press, a female die and a cross-head coacting to shear a plate into size for cupping, a male die coacting with the female die to cup the sheared plate, and means operated automatically by the cross-head in its receding movement to shear the waste portions of the plate.

8. In a shearing and shaping press, a female die and a movable cross-head coacting to shear a plate placed therebetween into size for cupping, a male die coöperating with the female die to cup the plate successively with the shearing operation, and means for shearing the waste from the plate successively with the cupping operation.

In testimony whereof I affix my signature in the presence of two witnesses.

GEORGE HALL.

Witnesses:
H. C. EVERT,
GEO. B. HERWICK.